United States Patent [19]

Kida et al.

[11] Patent Number: 5,659,769

[45] Date of Patent: Aug. 19, 1997

[54] TEXT SERVICES MANAGER

[75] Inventors: Yasuo Kida, Tokyo; Keisuke Hara, Yokohama; Nobuhiro Miyatake, Fuchu, all of Japan; John Harvey, Philadelphia, Pa.; Christopher S. Derossi, San Jose, Calif.; Yousuke Kurita, Cupertino, Calif.; Kenny Sung Ching Tung, San Jose, Calif.

[73] Assignee: Apple Computer, Inc., Cupertino, Calif.

[21] Appl. No.: 20,314

[22] Filed: Feb. 19, 1993

[51] Int. Cl.$^6$ ............... G06F 17/21; G06F 17/24; G06F 17/28
[52] U.S. Cl. ............... 395/792; 395/797; 395/751; 395/752; 395/758
[58] Field of Search ............... 364/419.02, 419.09, 364/419.1; 395/752, 792, 797, 751, 758

[56] References Cited

U.S. PATENT DOCUMENTS 4,615,002  9/1986  Innes ............... 364/16.2
5,175,855  12/1992  Putnam et al. ............... 395/700
5,285,387  2/1994  Kurahara et al. ............... 364/419.09
5,369,778  11/1994  San Soucie et al. ............... 395/800
5,371,675  12/1994  Greif et al. ............... 364/419.1
5,375,241  12/1994  Walsh ............... 395/700

Primary Examiner—Gail O. Hayes
Assistant Examiner—Junghoon Kenneth Oh
Attorney, Agent, or Firm—Carr, DeFilippo & Ferrell LLP

[57] ABSTRACT

A computer operating system Text Services Manager (TSM) operates as an interface between an application and a selection of text services, enabling the user to efficiently select from among a variety of text services without regard to the specific protocol requirements of the application. The TSM architecture consists of an application program which receives user input through the input event manager of the operating system toolbox routine. The TSM receives the user input event and controls the transmission of the event to a component manager for redirection to a specific text services component, based on the instructions of the TSM. The text services component processes the input method and returns the processed input to the TSM, where the TSM directs the generation of an appropriate protocol for return of the processed input event to the application.

20 Claims, 4 Drawing Sheets

TEXT SERVICES MANAGER

CROSS-REFERENCE TO RELATED APPLICATION

The subject matter of this application is related to the subject matter of co-pending application Ser. No. 08/019, 744, patented: U.S. Pat. No. 5,511,193, entitled "A Document System Providing Multiple Instances of Input Methods for Text Processing and Automatic Synchronization Between Methods", filed Feb. 19, 1993, which is commonly assigned with the present invention and is incorporated by reference herein.

BACKGROUND OF THE INVENTION

1. Field of the Invention

This invention relates to computer operating system software and more particularly to a method and system for communicating between computer application programs and various computer text services.

2. Description of the Background Art

An on-going problem in designing computers for use worldwide is adapting the standard QWERTY-type keyboard to handle the large number of characters found in the various written languages. For instance, written Chinese has no alphabet, instead it consists of approximately 50,000 characters. The Chinese writing system is logographic, meaning that each character stands for a word or part of a word. Popular Chinese writings including newspapers and novels use a sub-set of the total character set consisting of approximately 4,000 of the more commonly used graphs. Chinese text input on a computer requires a conversion using a series of keyboard keystrokes, for example from Pinyin (Roman) or Zhuyinfuhao (phonetic), to logographic Hanzi Chinese characters. Many other methods of generating Hanzi using a keyboard input are also possible.

The Japanese character set is borrowed from the Chinese system of writing. Characters from the Chinese system were simplified and codified into syllabaries, or tables of syllables, in written symbols cared kana. The two syllabaries in use today include the more commonly used rounded form known as hiragana and the less frequently used, square-shaped katakana. Modern Japanese writing, called kanji, is a combination of Chinese characters and kana. The official kanji character set has several thousand characters, although many more thousands of characters are in common use.

Similarly, Korean text input requires conversion from Jamo (phonetic) to non-ideographic Hangul, which consists of complex clusters of Jamo. The general approach to accessing the many letters of these character-based written language sets is to use a series of key strokes to either phonetically or symbolically address the desired character. The Japanese kanji equivalent of TOKYO, for instance, is the phonetic sequential characters TOU and KYOU.

To assist users of character-based text processing software, software developers have produced Front-End Processors (FEP's), which convert the sequential keyboard entries of the user to an appropriate letter of the target character set. These FEP's are also often referred to as "input methods". The front-end processors in the past have been very inflexible. Each application has had a specific FEP associated with it, and the user has had little choice as to which FEP was available. Users had little or no choice between using a phonetic-based FEP or a stroke-based FEP for a given application. This inflexibility between input methods is a particular problem when attempting to generate a document having multiple language translations, such as multi-national user's manual.

In addition to written language front-end processors, application programs take advantage of numerous other text services modules which augment and facilitate the capabilities of the application. Typical additional text services include spelling checkers, hyphenation checkers, grammar checkers, dictionary lookup services, thesauruses, syntax checkers and equation processors.

What is needed is a computer operating system text services manager which operates as an interface between a given application and a selection of text services, enabling the user to select from among and switch between various text services, without regard for the specific protocol requirements of the application.

SUMMARY OF THE INVENTION

In accordance with the present invention, a computer operating system Text Services Manager (TSM) operates as an interface between a given application and a selection of text services, enabling the user to efficiently select from among and use a variety of these text services, without regard to the specific protocol requirements of the application. In a preferred embodiment, the text processing architecture in which the TSM operates consists of an application program serviced by a toolbox, an event manager, a component manager and various text services. A user interface, such as a computer keyboard or pointing input device, receives input from a user and transfers the input to an input toolbox which handles input protocols between the application and the user interface. The TSM is connected to the application program and controls processing of the input between the application and the text services. A component manager located in the data path between the TSM and the text services components acts as a switching mechanism, directing the signal flow to an individual services component, in response to direction from the TSM. The text services components provide various auxiliary features to the application program including written language front-end processing, spell checking, hyphenation checking and the like. An AppleEvent manager located in the processed input return path between the TSM and the application program, generates an event signal in response to a command from the TSM signaling the application program to receive the processed input.

In operation, a user interface transmits an input event from the user. This user input event is received by the operating system toolbox and transferred to the application program for processing. The application then transfers the input event to the TSM through a software program call. If the application is not compatible with the TSM (not "TSM-aware"), then the TSM transfers the user input to special driver routines for processing. If the application is TSM-aware, the TSM creates a link with the appropriate text services component through the component manager. The component manager transfers the input to the specific component as directed by the TSM. Once the input is transferred to the appropriate component, processing of the input occurs by the component and the processed input is transferred back to the TSM. Following receipt of the processed input event, the TSM causes the AppleEvent manager to generate the necessary event protocols for communicating the processed inputs to the application program.

An important use of the TSM is in the translation of various keyboard input key sequences into written characters utilizing one or more front-end processors (FEP's).

Front-end processors are special text services which translate keystroke sequences into written language characters. A series of keystrokes, for instance, is entered which represents a kanji character. The TSM receives the input key sequence, selects an appropriate Japanese FEP, directs the sequence to the FEP for processing, and returns the translated written character to the application program via an event sequence produced by the AppleEvent manager.

DESCRIPTION OF THE PREFERRED EMBODIMENT

Figure 1:
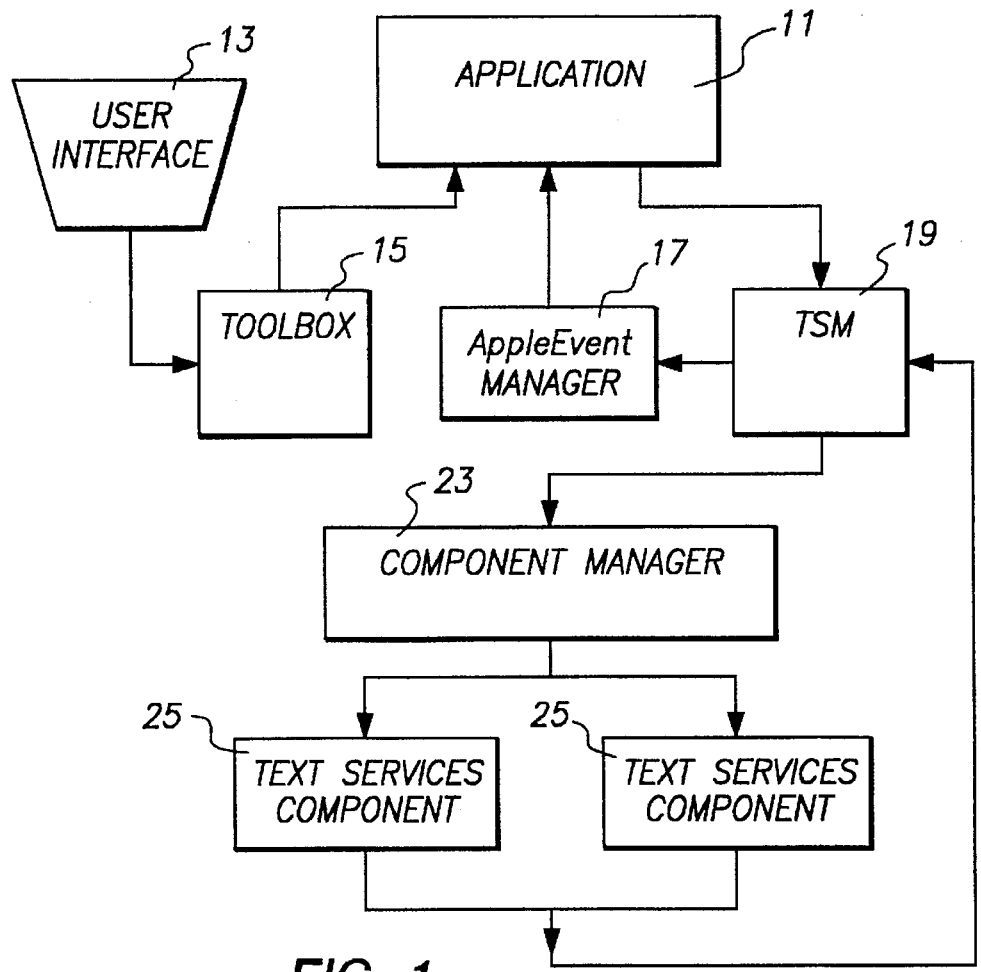
FIG. 1 is a block diagram showing the text services architecture of the present invention.

Referring now to FIG. 1, a text processing architecture is shown in which a Text Services Manager (TSM) 19 operates as an interface between an application program 11 and a selection of text services components 25. In the preferred embodiment, the present invention is implemented as Macintosh System Software version 7.1, developed and owned by Apple Computer, Inc. of Cupertino, Calif. The text processing architecture in which TSM 19 operates consists of an application 11, serviced by a toolbox 15, an AppleEvent manager 17, a component manager 23, and various text services components 25.

An application 11 that explicitly uses TSM 19 is called a TSM-aware application. An application 11 that does not make calls to TSM 19 is not TSM-aware. The present invention addresses the use of TSM 19 with TSM-aware applications.

Inputs to application 11 are made through user interface 13. User interface 13 can be a keyboard, a mouse-type pointing device, a digitizing tablet, a track ball, or other such implement. User interface 13 communicates with application 11 through toolbox 15. Toolbox 15, as implemented in Apple Macintosh system software, is a collection of system services, one of which is an event manager which handles the transfer of keyboard events to the application. The Apple Toolbox is discussed in detail in the text, *Inside Macintosh*, Addison-Wesley Publishing Company, Inc., 1985, Vols. I–IV: *Inside Macintosh* is incorporated by reference herein.

Application 11 is a computer program which utilizes the input from toolbox 15. A typical application 11 might include a word processor, checkbook register, spreadsheet, or graphics design program. TSM 19 receives input from application 11 and directs the input to text services 25 through component manager 23. TSM 19 provides a structure for the efficient flow of information between application 11 and text services components 25, and thereby allows application 11 to obtain text services without having to know anything about the specific text services components 25 performing these services. Likewise, the use of TSM 19 allows text services components 25 to perform their services without having to know anything about the specific application 11 making the request.

Component manager 23 acts to direct the input event from application 11 to one of the various text services components 25 as instructed by TSM 19. In the preferred embodiment, component manager 23 is a service for registering, managing and communicating with blocks of code, generically called components; each of the various text services are such components. The component manager 23 is described in detail in *Quicktime Developer's Guide*, Apple Computer, Inc., 1991, which is incorporated by reference herein.

A text services component 25 is a specific text-handling routine for performing tasks such as spell-checking, hyphenation, and handling input strings of complex text. An important application of a text services component 25 is for use as an input method or frontend processor (FEP) in translating keystroke sequences provided at user interface 13, into written language characters such as kanji and hana. The use of the text services manager 19 in conjunction with FEP's will be discussed in more detail with respect to FIGS. 4 and 5 below.

After one of the text services components 25 processes the input event, the processed input is transmitted back to application 11 via TSM 19. The processed input might be a final result or it might also be intermediate results as part of the user interface. In the preferred embodiment, the passing of the processed event from text services components 25 to application 11 occurs using AppleEvent manager 17. The basic model provides that two independent pieces of code, text services component 25 and application 11, need to communicate with each other. In the Apple Macintosh, AppleEvents is used as a way for events to be communicated to and from application 11. The information to be passed from text services 25 to application 11 can be quite complex, and AppleEvents is a good, conventional transport medium for such complex data types. AppleEvents are discussed in *Inside Macintosh*, Addison-Wesley Publishing Company, Inc., 1985, Vols. I–IV.

Figure 2:
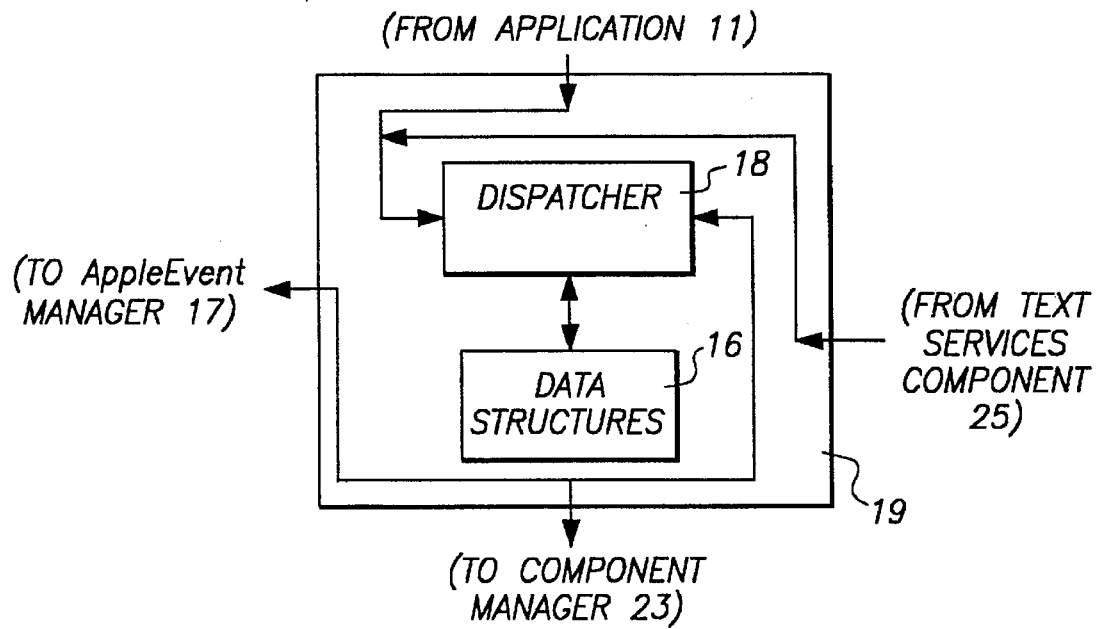
FIG. 2 is a block diagram showing internal details of the TSM.

Referring now to FIG. 2, a block diagram of TSM 19 is shown as used in the preferred embodiment of the present invention. The TSM 19 preferably comprises a dispatcher 18 and data structures 16. The dispatcher 18 is coupled for communication with application 11, AppleEvent manager 17, text services components 25 and component manager 23. Dispatcher 18 is additionally coupled to certain driver modules (not shown) which are used for processing non-TSM-aware applications. Dispatcher 18 oversees the communication between application 11 and component manager 23. Dispatcher 18 receives events from application 11 and then sends (dispatches) the event to the proper text services component 25 (via the component manager 23) associated with the particular application 11 that generated the event. Dispatcher 18 determines the appropriate text services component 25 by referencing information stored in data structures 16. Once the text services component 25 completes its processing of the event, the processed event is returned to application 11 via TSM 19. For the return path, dispatcher 18 performs a similar function by using data structures 16 to return the processed event to application 11. TSM 19 then sends the event to the identified application. The use of such a TSM structure is particularly advantageous because it greatly simplifies the use of various input methods for the application. The programmers no longer have to specifically identify the input method used by a particular application; instead, it is automatically handled by TSM 19.

Dispatcher 18 is a system of programmed instructions which receives a program call as an input, and utilizes data structures 16 to deliver the input to a specific component 25. A program call, for example, from application 11 would cause dispatcher 18, based on address data stored in data structures 16, to transmit an application 11 event to a specific text services component 25 for services processing. A detailed description of the handling of program calls by TSM 19 is contained in the document, entitled "Text Services Manager" and incorporated herein by reference.

Additional details relating to data structures 16 are contained in U.S. patent application Ser. No. 08/019,744, entitled "A Document System Providing Multiple instances of input Methods for Text Processing and Automatic Synchronization Between Methods", incorporated herein by reference.

Figure 3:
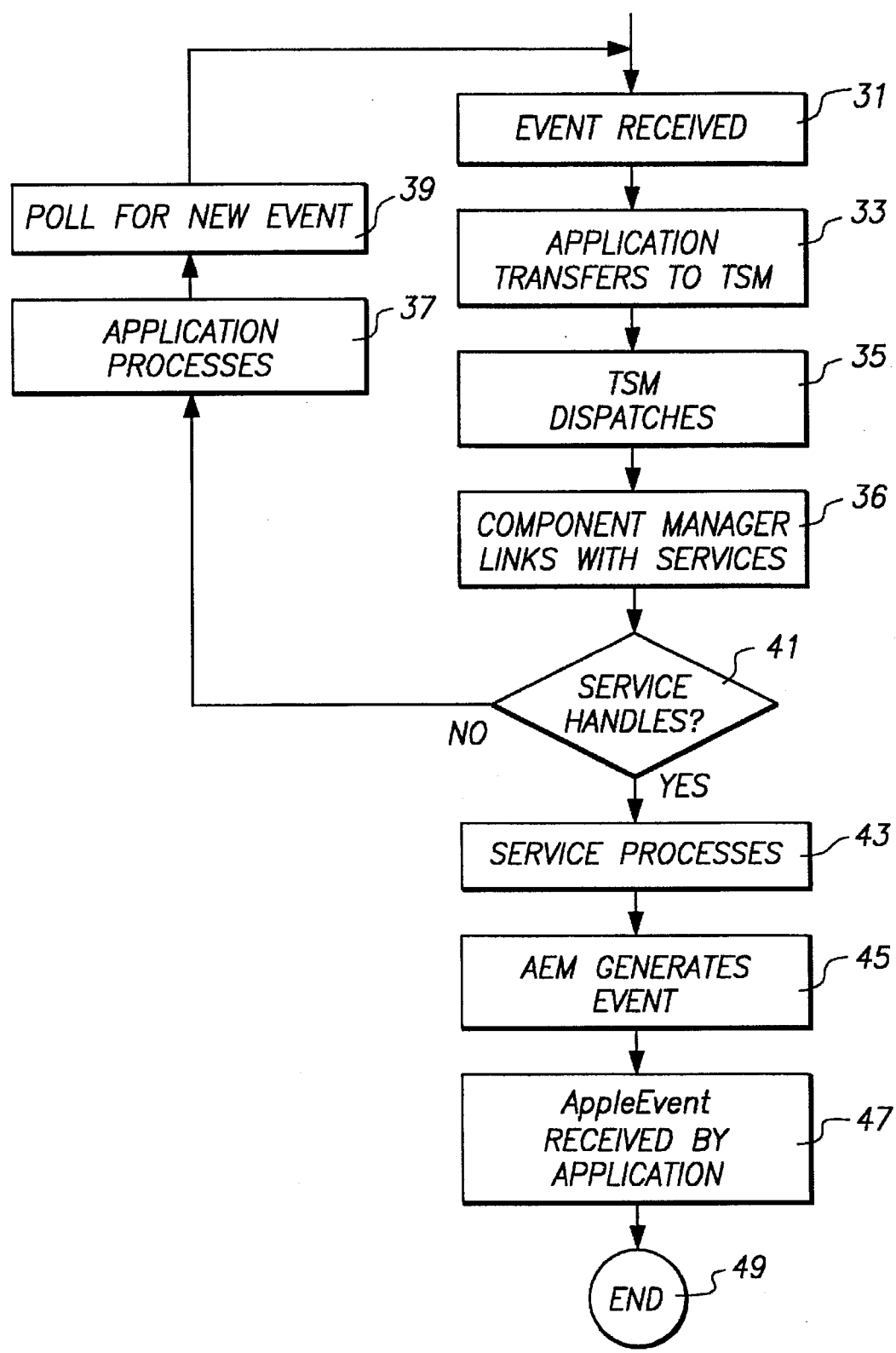
FIG. 3 is a flow diagram showing the method of the present invention in which the TSM directs user input events between an application program and a selection of text services.

Referring now to FIG. 3, a flow chart is shown outlining the operation of the TSM architecture illustrated and described in FIG. 1. The first step of the TSM process occurs when a user input is received 31 at interface 13. This user input may be a response to an application 11 query or may be a command requesting action from the application. The user input is received and stored by toolbox 15, which may be periodically polled by application 11. Upon receiving a user input, toolbox 15 internally generates an input event, which conforms the user input to a protocol acceptable to application 11. In the preferred method, application 11 receives the user input event and then transfers 33 the event to TSM 19. As discussed above with reference to FIG. 2, dispatcher 18 of TSM 19 cooperates with data structures 16 to dispatch 35 the input event received from application 11 to component manager 23. Component manager 23 acts as a switching mechanism under the direction of TSM 19 to link 36 the input event to the proper text services component 25. In step 41, the specific text services component 25 evaluates the input event from TSM 19 and determines whether to process the event 43, or whether to return the unprocessed event to application 11 for processing 37. If the input event is returned to application 11 for processing 37, the event is processed and the application returns to polling 39 toolbox 15 for new input events. Assuming the text services component 25 determines to process the input event, processing 43 occurs, thereby providing one of the text services such as spell-checking or written character translation, discussed above. Following processing 43 by the text services component 25, the text services component returns the processed input to TSM 19 for ultimate return to application 11. TSM 19 then causes AppleEvent manager 17 to generate 45 an Apple Event, which allows application 11 to receive 47 the processed input. The text servicing of this input thereby ends 49 and the application returns to polling toolbox 15 for additional inputs.

Figure 4:
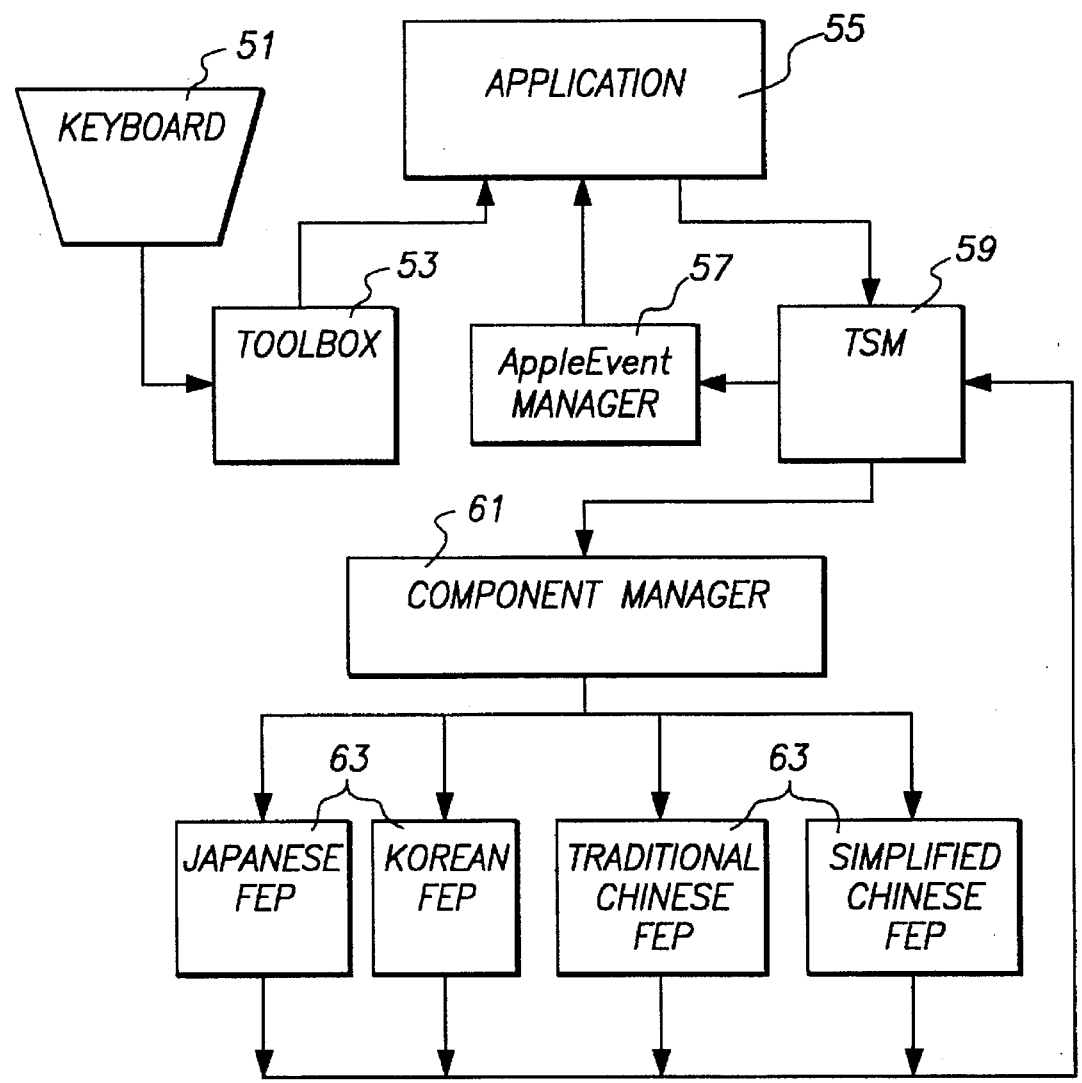
FIG. 4 is a block diagram showing the text services architecture used in which the TSM directs text processing events between a text processing application program and a selection of written language front-end processors.

Referring now to FIG. 4, the TSM architecture is shown in which a keyboard 51 is used to enter key sequences to address written language characters using front-end processors (FEP's) 63. In a manner similar to the architecture of FIG. 1, keyboard 51 is connected to application 55 through toolbox 53. Text services manager (TSM) 59 acts as an interface between application 55 and FEP's 63 controlling the selection of a particular FEP using component manager 61. Language FEP's 63 presently implemented in the Apple Macintosh System Software 7.1 include Japanese, Korean, traditional Chinese and simplified Chinese. Other FEP's 63 may be developed and easily inserted into the TSM environment of FIG. 4. AppleEvent manager 57 receives the translated written character and provides an interface to application 55.

Figure 5:
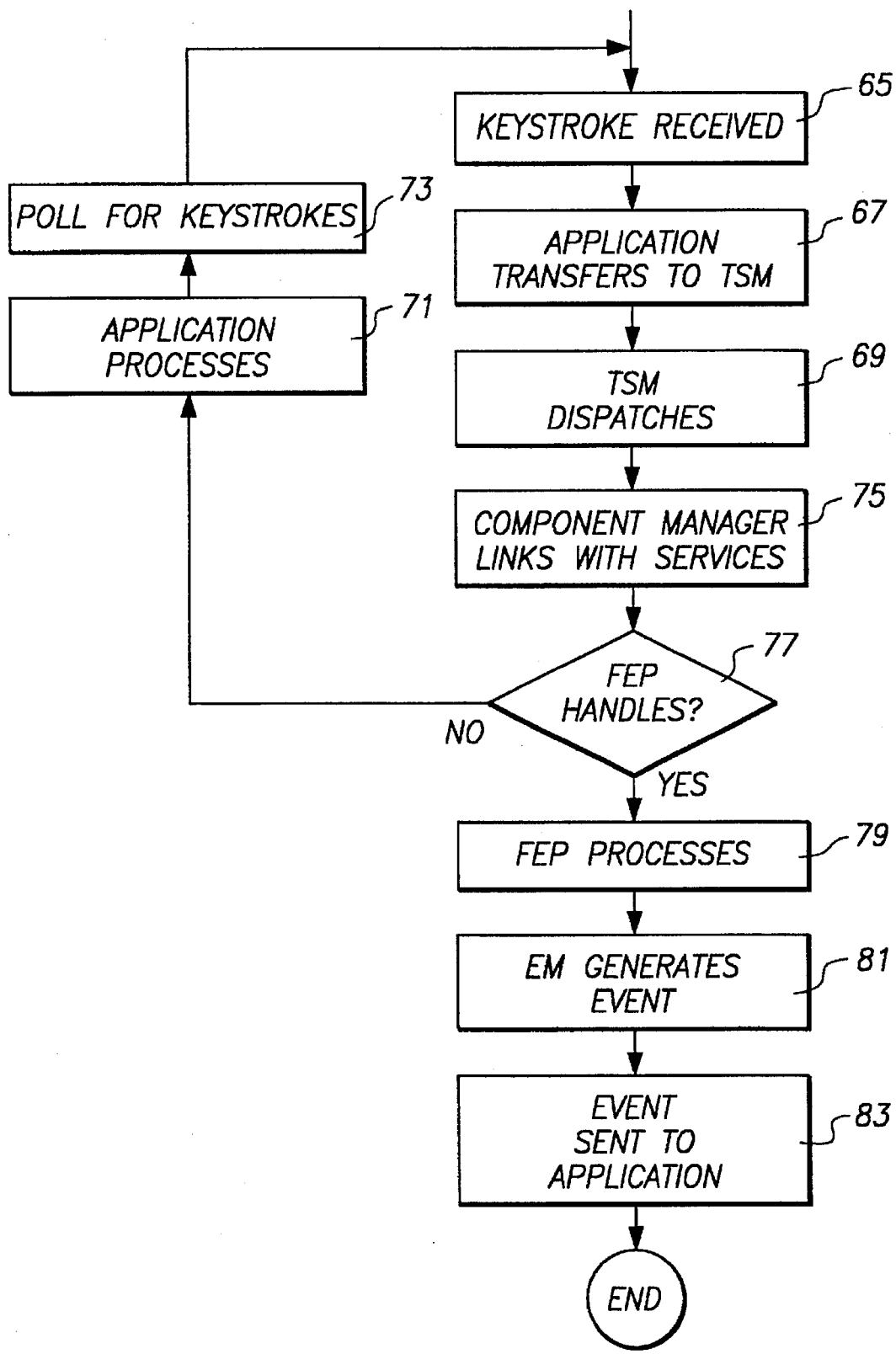
FIG. 5 is a flow diagram showing the method of the present invention in which the TSM directs text processing events between a text processing application program and a selection of front-end processors.

Referring now to FIG. 5, a flow chart is shown in which a series of keystrokes are entered into keyboard 51, received 65 by toolbox 53, and transferred as an input (or keyboard) event to application 55. Application 55 receives the keyboard event and then transfers 67 the event to TSM 59. TSM 59 dispatches 69 the keyboard event received from application 55 to component manager 61. Component manager 61 acts as a switching mechanism under the direction of TSM 59 to link 75 the keyboard event to the proper language FEP 63. In step 77, the FEP 63 component evaluates the keyboard event from TSM 59 and determines whether to process the event 79 (i.e. convert the keystroke sequence to a written language character) or whether to return the unprocessed keyboard input to application 55 for processing 71. If the application processes 71 the keyboard event, then the application subsequently continues polling 73 keyboard 51 for further keystrokes. Assuming FEP 63 determines to process the keyboard input, processing 79 occurs, thereby providing conversion to a character of one of the FEP 63 written languages selected. Following processing 79, the written language character is returned to TSM 59. Under control of TSM 59 the AppleEvent manager 57 generates 81 the necessary AppleEvent protocol to send 83 the translated characters to application 55.

The invention has now been explained with reference to specific embodiments. Other embodiments will be apparent to those of ordinary skill in the art in light of this disclosure. For instance, it would be obvious to implement the front-end processors of the present invention under a DOS- or UNIX-based operating system, using the TSM architecture described herein. Therefore, it is not intended that this invention be limited, except as indicated by the appended claims.

We claim:

1. A programmable computer having a text services management architecture for providing various text services to an application program comprising:

a computer application program;

a text services manager connected to the application program for receiving a first event from the application program directing a text service for the application program and for controlling text servicing of the first event;

component manager means connected to the text services manager for directing the flow of the first event from the text services manager in response to control commands from the text services manager;

text services means connected to the component manager means for receiving and text servicing the first event and for returning a serviced first event to the text services manager; and event manager means connected between the text services manager and the application program for generating a second event in response to a command from the text services manager, the second event signaling the application program to receive the serviced first event.

2. The computer of claim 1 further comprising a user interface means connected to the application program for receiving user inputs.

3. The computer of claim 2, wherein the interface means is a computer keyboard.

4. The computer of claim 3 in which the text services means is an input method for translating keystrokes entered on the computer keyboard to a written language character.

5. The computer of claim 1, wherein the text services manager further comprises:

dispatcher means which is coupled between the application program and the component manager means for receiving the first event from the application and for communicating the first event to the component manager means along with address instructions to the text services means identifying text services to be performed by the text services means on the first event.

6. The computer of claim 5, wherein the dispatcher means further connects the text services means to the event manager means for returning the serviced first event to the event manager means.

7. The computer of claim 5, further comprising driver means, wherein the dispatcher means further connects the application means to the driver means for transferring the input event to the driver means when the application is identified as not being TSM-aware.

8. The computer of claim 5, further comprising a data structure means which is connected to the dispatcher means for storing address instructions which are accessed by the dispatcher means in response to input events to the text services means.

9. The computer of claim 1 further comprising a toolbox means connected to the application program for receiving user inputs and communicating the inputs to the application program as first events.

10. A programmable computer having a text processing architecture for translating character sequences into written language characters, the architecture comprising:

user interface means for receiving character sequences from a user;

an application program connected to the user interface means for processing text in response to character sequences received from the user interface means;

a text services manager connected to the application program for evaluating character sequences received by the application program and for controlling the translation and processing of the character sequences into written language characters;

component manager means connected to the text services manager for directing the flow of character sequences from the text services manager in response to control commands from the text services manager;

front-end processor means connected to the component manager means for receiving and translating the character sequences into written language characters and returning the written language characters to the text services manager; and event manager means connected between the text services manager and the application program for generating an event in response to a command from the text services manager, the event signaling the application program to receive the translated written language character.

11. The computer of claim 10, wherein the character sequence is a sequence of keyboard keystrokes.

12. The computer of claim 10, wherein the user interface means is a keyboard.

13. The computer of claim 10, wherein the user interface means is a pen-based input means.

14. The computer of claim 10, wherein the user interface means is a voice recognition system.

15. The computer of claim 10, wherein the application program is a word processor.

16. In a programmable computer, a method for managing text services between an application program and text services components using a text services manager (TSM), the method comprising the steps:

receiving an input event by the application program from a computer user;

transferring the input event from the application program to the TSM, wherein the TSM controls further text services;

dispatching the input event from the TSM to a component manager, wherein the input event is directed to a specific text services component in response to addressing control commands from the TSM;

processing the input event by the text services component; and returning the processed input event to the TSM where the processed input event is communicated back to the application program.

17. The method for managing text services according to claim 16, wherein the TSM comprises a dispatcher and a data structure means, and wherein the step of dispatching the input event from the TSM further comprises the steps:

receiving an input event by the dispatcher from the application program:

accessing the data structure means for addressing control commands relevant to the input event; and dispatching the input event to the component manager along with addressing control commands accessed from the data structures means.

18. The method for managing text services according to claim 16, wherein the input event is received from a keyboard.

19. The method for managing text services according to claim 16, wherein the input event is a keyboard sequence which represents a written language character.

20. The method for managing text services according to claim 16, wherein the step of processing comprises the conversion of a keyboard sequence to a written language character.

\* \* \* \* \*